(12) United States Patent
Kim et al.

(10) Patent No.: US 9,279,033 B2
(45) Date of Patent: *Mar. 8, 2016

(54) POLYESTER RESIN AND METHOD FOR PREPARING THE SAME

(71) Applicant: SK CHEMICALS CO., LTD., Gyeonggi-do (KR)

(72) Inventors: Ji-Hyun Kim, Gyeonggi-do (KR); Yoo Jin Lee, Gyeonggi-do (KR)

(73) Assignee: SK CHEMICALS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,203

(22) PCT Filed: May 21, 2013

(86) PCT No.: PCT/KR2013/004453
§ 371 (c)(1),
(2) Date: Dec. 3, 2014

(87) PCT Pub. No.: WO2013/183874
PCT Pub. Date: Dec. 12, 2013

(65) Prior Publication Data
US 2015/0197598 A1      Jul. 16, 2015

(30) Foreign Application Priority Data

Jun. 5, 2012  (KR) .......................... 10-2012-0060453

(51) Int. Cl.
| | | |
|---|---|---|
| C08G 63/02 | (2006.01) | |
| C08G 63/199 | (2006.01) | |
| C08G 63/83 | (2006.01) | |
| C08K 5/49 | (2006.01) | |
| C08G 63/672 | (2006.01) | |

(52) U.S. Cl.
CPC ............ *C08G 63/199* (2013.01); *C08G 63/672* (2013.01); *C08G 63/83* (2013.01); *C08K 5/49* (2013.01)

(58) Field of Classification Search
CPC ................................ C08G 63/85; C08G 63/78
USPC .................................. 528/271, 272, 279, 286
See application file for complete search history.

(56) References Cited

U.S. PATENT DOCUMENTS

| 5,674,801 A | 10/1997 | George |
| 6,329,031 B1 | 12/2001 | Kitagawa et al. |
| 2004/0092703 A1 | 5/2004 | Germroth et al. |
| 2007/0149757 A1 | 6/2007 | Nakajima et al. |
| 2011/0269933 A1* | 11/2011 | Park et al. ..................... 528/286 |

FOREIGN PATENT DOCUMENTS

| CN | 1711302 | 12/2005 |
| EP | 0550034 | 7/1993 |
| EP | 1593702 | 11/2005 |
| EP | 2857431 | 4/2015 |
| JP | 10-279676 | 10/1998 |
| JP | 2005-120254 | 5/2005 |
| KR | 10-0181687 | 5/1999 |
| KR | 10-0562462 | 2/2001 |
| KR | 10-2004-0036045 | 4/2004 |
| KR | 10-2004-0083544 | 10/2004 |
| KR | 10-2007-0012471 A | 1/2007 |
| KR | 20080054278 A | 6/2008 |
| KR | 20090073373 A | 7/2009 |
| KR | 20100079766 A | 7/2010 |
| KR | 20100079775 A | 7/2010 |
| KR | 10-2011-0028696 A | 3/2011 |
| KR | 20110052890 A | 5/2011 |
| KR | 20110135828 A | 12/2011 |
| WO | WO 2011/058130 A1 | 11/2010 |

OTHER PUBLICATIONS

International Search Report prepared by the Korean Patent Office on Aug. 23, 2013, for International Application No. PCT/KR2013/004453.
Extended European Search Report for European Patent Application No. 13799976.9, dated Dec. 3, 2015, 8 pages.

* cited by examiner

*Primary Examiner* — Terressa Boykin
(74) *Attorney, Agent, or Firm* — Sheridan Ross P.C.

(57) ABSTRACT

There is provided a polyester resin including: moieties of dicarboxylic acid components including terephthalic acid; and moieties of diol components including 5 to 60 mole % of isosorbide, 10 to 80 mole % of a cyclohexanedimethanol, and the balance of other diol compounds, wherein the polyester resin has an intrinsic viscosity of 0.5 to 1.0 dl/g, and a melt viscosity of the polyester resin measured at a temperature of 280° C. and at a shear rate of 300 rad/s is at least 50% lower than that measured at a temperature of 280° C. and a shear rate of 1 rad/s, and there is also provided a method for preparing the polyester resin, including: esterifying diol components including 5 to 60 mole % of isosorbide, 10 to 80 mole % of a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

17 Claims, No Drawings

POLYESTER RESIN AND METHOD FOR PREPARING THE SAME

CROSS REFERENCE TO RELATED APPLICATIONS

This application is a national stage application under 35 U.S.C. 371 and claims the benefit of PCT Application No. PCT/KR2013/004453 having an international filing date of May 21, 2013, which designated the United States, which PCT application claimed the benefit of Korean Patent Application No. 10-2012-0060453 filed Jun. 5, 2012, the disclosure of both the above-identified applications are incorporated herein by reference.

TECHNICAL FIELD

The present invention relates to a polyester resin and a method for preparing the same. More specifically, the present invention relates to a polyester resin that exhibits excellent physical properties such as high resistance to heat, chemicals, and impact, and has excellent appearance properties, high transparency, and superior molding characteristics, and a method for preparing the polyester resin.

BACKGROUND OF THE ART

Generally, polyester resins are prepared by reacting aromatic and aliphatic dicarboxylic acids with diol compounds. Polyester resins have excellent physical and chemical properties, are highly soluble in general solvents, are highly flexible, have good adhesion to a broad range of materials and good coating workability, etc. Due to these advantages, polyester resins are used in various applications, such as for fibers, films, and adhesives.

However, previously known polyester resins have poor resistance to chemicals, for example surfactants to which humans are frequently exposed in practical life, have colors and appearance properties that are unsuitable for use in particular applications, and have insufficient impact strength. Attempts to solve such problems of polyesters have been made through many methods, for example, methods including adding various starting materials, monomers, or additives in the course of synthesis, or methods including mixing with other resins. Particularly, previous synthetic fibers or synthetic resin products obtained from polyesters tend to yellow in appearance. In attempts to hide or counteract such appearance properties, methods associated with the use of additives such as cobalt-based colorants have been generally used.

It is known that in the synthesis of a polyester resin, the degree of polymerization of the final polyester resin or the proportions of raw materials present in the main chain of the resin vary depending on the reactivity of the raw materials during esterification or transesterification and on the degree of vaporization of the raw materials during polycondensation. Particularly, when it is intended to synthesize a polyester resin using a secondary or tertiary alcohol as a diol component, a sufficiently long reaction time is required or a very low reaction yield is obtained.

A method for synthesizing a polyester resin using an alcohol such as 1,4-cyclohexanedimethanol or isosorbide as a reactant has been known in recent years. According to this method, however, the use of the secondary alcohol makes it difficult to achieve a high reaction yield and a markedly improved degree of polymerization of the resin. That is, when isosorbide is used for the purpose of increasing the physical properties (e.g., heat resistance) of the resin, a low degree of polymerization is caused or an excessively large amount of the raw materials remain without participating in the reaction. As a result, the final polyester resin may have problems of low impact resistance or durability and very poor appearance properties.

Furthermore, some already known polyester resins do not substantially lose their viscosity during hot extrusion, making it difficult to mold them into final products with a uniform thickness or to manufacture high-volume or large-area products.

Thus, there is a need to develop a method for preparing a polyester resin with improved physical properties, excellent appearance properties, and good moldability into a final product, by which the efficiency of the polymerization reaction and the residual rate of raw materials in the final product can be increased.

DETAILED DESCRIPTION OF THE INVENTION

Technical Objectives

It is one object of the present invention to provide a polyester resin that exhibits excellent physical properties such as high resistance to heat, chemicals, and impact, and has excellent appearance properties, high transparency, and superior molding characteristics.

It is another object of the present invention to provide a method for preparing a polyester resin with improved physical properties and excellent appearance properties, by which the efficiency of the polymerization reaction and the residual rate of raw materials in the final product can be increased.

Technical Solutions

There is provided a polyester resin including: moieties of dicarboxylic acid components including terephthalic acid; and moieties of diol components including 5 to 60 mole % of isosorbide, 10 to 80 mole % of a cyclohexanedimethanol, and the balance of other diol compounds, wherein the polyester resin has an intrinsic viscosity of 0.5 to 1.0 dl/g, and a melt viscosity of the polyester resin measured at a temperature of 280° C. and at a shear rate of 300 rad/s is at least 50% lower than that measured at a temperature of 280° C. and a shear rate of 1 rad/s.

There is also provided a method for preparing the polyester resin, including: esterifying diol components including 5 to 60 mole % of isosorbide, 10 to 80 mole % of a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

A polyester resin and a method for preparing the polyester resin according to specific embodiments of the invention will now be described in more detail.

According to one embodiment of the invention, a polyester resin may include: moieties of dicarboxylic acid components including terephthalic acid; and moieties of diol components including 5 to 60 mole % of isosorbide, 10 to 80 mole % of a cyclohexanedimethanol, and the balance of other diol compounds, wherein the polyester resin has an intrinsic viscosity of 0.5 to 1.0 dl/g, and a melt viscosity of the polyester resin measured at a temperature of 280° C. and at a shear rate of 300 rad/s is at least 50% lower than that measured at a temperature of 280° C. and a shear rate of 1 rad/s.

The present inventors conducted research on the synthesis of a polyester with improved physical properties, and as a result, found through experimentation that when a catalyst including a zinc compound is used for an esterification reaction, a phosphorus-based stabilizer is added to the reaction solution at the end of the esterification reaction, for example, at the time when the degree of esterification reaches at least 80%, and the resulting esterification reaction product is subjected to polycondensation, which will be described in the following preparation method, a polyester resin can be provided that exhibits excellent physical properties, such as high resistance to heat, chemicals, and impact, and has excellent appearance properties, high transparency, and superior molding characteristics. The present invention has been accomplished on the basis of this finding.

As previously known, isosorbide is a secondary alcohol with low reactivity. Polyester resins prepared using isosorbide have improved physical properties such as good heat resistance, but an excess of isosorbide remains unreacted without participating in an esterification reaction and the final polyester resin products are difficult to commercialize due to their insufficient physical properties.

In contrast, the polyester resin according to the embodiment of the invention is synthesized by the following specific preparation method, and includes a controllable amount of isosorbide. Particularly, the polyester resin including a relatively large amount of isosorbide can ensure physical properties, making the polyester resin applicable to commercial products.

In the course of the synthesis of the polyester resin, a relatively small amount of the raw materials remain unreacted without participating in the reaction, and the raw materials react with high efficiency and a high degree of polymerization. Thus, the polyester resin may have an intrinsic viscosity of 0.5 to 1.0 dl/g.

Particularly, the polyester resin may have a lower melt viscosity upon extrusion molding than previously known polyester resins due to its molecular structural features, along with high heat resistance. This can enhance relatively high processability and moldability of the polyester resin.

Specifically, the melt viscosity of the polyester resin measured at a temperature of 280° C. and a shear rate of 300 rad/s may be at least 50% lower than that measured at a temperature of 280° C. and a shear rate of 1 rad/s. That is, the melt viscosity of the polyester upon hot extrusion molding may be lowered to a level sufficient for molding.

The polyester may have a melt viscosity of 480 Pa·s to 600 Pa·s at a temperature of 280° C. and a shear rate of 1 rad/s, and a melt viscosity of 200 Pa·s to 280 Pa·s at a temperature of 280° C. and a shear rate of 300 rad/s.

As described above, the polyester resin has low melt viscosity characteristics upon hot extrusion molding but has a melt viscosity above a predetermined level, for example, 500 Pa·s to 600 Pa·s, when no shear force is applied thereto before or after extrusion, i.e., at a shear rate of 0 rad/s. The melt viscosity characteristics of the polyester resin can allow a final molded article after extrusion molding to have a more uniform thickness and improved dimensional stability, and facilitate the application of the polyester resin to the manufacture of a large-volume or large-area molded article.

The melt viscosity means the viscosity of a product discharged from a discharge part at a predetermined temperature during processing of a polymer resin. The melt viscosity of the product, which is dependent on temperature, shear rate, and shear stress, can be calculated by measuring the stress and the shear rate of the polymerization product in the temperature region where the product is discharged, and substituting the measured values into the following Equation 1.

$$\eta = \sigma/\gamma$$ [Equation 1]

Herein, $\eta$ is the melt viscosity, $\sigma$ is the shear stress, and $\gamma$ is the shear rate.

The polyester resin includes: moieties of dicarboxylic acid components including terephthalic acid; and moieties of diol components including isosorbide, a cyclohexanedimethanol, and the balance of other diol compounds.

As used herein, the term "moiety" refers to a certain segment or unit that is included in a product and derived from a specific compound when the specific compound participates in a chemical reaction to form the product. For example, the moieties of the dicarboxylic acid components and the moieties of the diol components refer to segments derived from the dicarboxylic acid components and segments derived from the diol components in the polyester formed by an esterification or polycondensation reaction, respectively.

The term "dicarboxylic acid components" is intended to include dicarboxylic acids such as terephthalic acid, alkyl esters thereof (including $C_1$-$C_4$ lower alkyl esters such as monomethyl, monoethyl, dimethyl, diethyl, or dibutyl esters), and/or acid anhydrides thereof. The dicarboxylic acids may react with the diol components to form dicarboxylic acid moieties such as terephthaloyl moieties.

The use of terephthalic acid as one of the dicarboxylic acid components in the synthesis of the polyester can contribute to improvements in the physical properties, such as heat resistance, chemical resistance, or weather resistance (for example, prevention of molecular weight reduction or yellowing caused by UV) of the polyester resin.

The dicarboxylic acid components may further include aromatic dicarboxylic acid components, aliphatic dicarboxylic acid components, or mixtures thereof as other dicarboxylic acid components. The term "other dicarboxylic acid components" means dicarboxylic acid components other than terephthalic acid.

The aromatic dicarboxylic acid components may be $C_8$-$C_{20}$, preferably $C_8$-$C_{14}$ aromatic dicarboxylic acids, or mixtures thereof. Specific examples of the aromatic dicarboxylic acid components include, but are not limited to, isophthalic acid, naphthalenedicarboxylic acids such as 2,6-naphthalenedicarboxylic acid, diphenyl dicarboxylic acids, 4,4'-stilbenedicarboxylic acid, 2,5-furandicarboxylic acid, and 2,5-thiophenedicarboxylic acid.

The aliphatic dicarboxylic acid components may be $C_4$-$C_{20}$, preferably $C_4$-$C_{12}$ aliphatic dicarboxylic acid components, or mixtures thereof. Specific examples of the aliphatic dicarboxylic acids include, but are not limited to, cyclohexanedicarboxylic acids such as 1,4-cyclohexanedicarboxylic acid and 1,3-cyclohexanedicarboxylic acid, and linear, branched, or cyclic aliphatic dicarboxylic acid components such as phthalic acid, sebacic acid, succinic acid, isodecylsuccinic acid, maleic acid, fumaric acid, adipic acid, glutaric acid, and azelaic acid.

The dicarboxylic acid components may include: 50 to 100 mole %, preferably 70 to 100 mole %, of terephthalic acid; and 0 to 50 mole %, preferably 0 to 30 mole %, of at least one dicarboxylic acid selected from the group consisting of aromatic dicarboxylic acids and aliphatic dicarboxylic acids. If the content of terephthalic acid in the dicarboxylic acid components is outside the range defined above, the physical properties (such as heat resistance, chemical resistance, or weather resistance) of the polyester resin may be deteriorated.

The diol components used in the synthesis of the polyester may include 5 to 60 mole % of isosorbide, 10 to 80 mole % of a cyclohexanedimethanol, and the balance of other diol compounds.

The use of isosorbide (1,4:3,6-dianhydroglucitol) in the diol components contribute to improvements in the physical properties (for example, heat resistance and chemical resistance) of the polyester resin. As the content of the cyclohexanedimethanol (for example, 1,2-cyclohexanedimethanol, 1,3-cyclohexanedimethanol, or 1,4-cyclohexanedimethanol) in the diol components increases, the impact resistance strength of the polyester resin may be remarkably increased.

The diol components may further include diol components other than the isosorbide and cyclohexanedimethanol. The term "other diol components" refers to diol components other than the isosorbide and cyclohexanedimethanol, and may be, for example, aliphatic diols, aromatic diols, or mixtures thereof.

The aromatic diols may include $C_8$-$C_{40}$, preferably $C_8$-$C_{33}$ aromatic diol compounds. Specific examples of the aromatic diol compounds include, but are not limited to, ethylene oxides such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, and polyoxyethylene-(6)-2,2-bis(4-hydroxyphenyl)propane, and/or propylene oxide addition bisphenol A derivatives (polyoxyethylene-(n)-2,2-bis(4-hydroxyphenyl)propane, polyoxypropylene-(n)-2,2-bis(4-hydroxyphenyl)propane, or polyoxypropylene-(n)-polyoxyethylene-(n)-2,2-bis(4-hydroxyphenyl)propane). Here, n means the number of the polyoxyethylene or polyoxypropylene units.

The aliphatic diols may include $C_2$-$C_{20}$, preferably $C_2$-$C_{12}$ aliphatic diol compounds. Specific examples of the aliphatic diol compounds include, but are not limited to, linear, branched, or cyclic aliphatic diol components such as ethylene glycol, diethylene glycol, triethylene glycol, propanediols (e.g., 1,2-propanediol and 1,3-propanediol), 1,4-butanediol, pentanediols, hexanediols (e.g., 1,6-hexanediol), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, and tetramethylcyclobutanediol.

As described above, the diol components of the polyester resin may include 5 to 60 mole %, preferably 8 to 45 mole %, of isosorbide. If the content of isosorbide in the diol components is less than 5 mole %, the heat resistance or chemical resistance of the polyester resin may be insufficient and the melt viscosity characteristics of the polyester resin may not be exhibited. Meanwhile, if the content of isosorbide exceeds 60 mole %, the appearance properties of the polyester resin or products may be deteriorated or yellowing may occur.

The polyester resin may contain 1 to 100 ppm of a zinc-based catalyst, in terms of the central metal atom content, based on the total amount of the resin, and 10 ppm to 300 ppm of a phosphorus-based stabilizer.

A phosphorus-based stabilizer may be used in the course of the synthesis of the polyester resin. The polyester resin may contain 10 ppm to 300 ppm, preferably 20 ppm to 200 ppm, of the phosphorus-based stabilizer. Specific examples of such phosphorus-based stabilizers include phosphoric acid, trimethyl phosphate, triethyl phosphate, triphenyl phosphate, and triethyl phosphonoacetate. These phosphorus-based stabilizers may be used alone or as a mixture of two or more thereof.

The polyester resin may include 1 to 100 ppm of a zinc-based catalyst, in terms of the central metal atom content, based on the total amount of the resin. Specific examples of such zinc-based catalysts include zinc acetate, zinc acetate dihydrate, zinc chloride, zinc sulfate, zinc sulfide, zinc carbonate, zinc citrate, and zinc gluconate. These zinc-based catalysts may be used alone or as a mixture thereof.

In the course of the synthesis of the polyester resin, a polycondensation catalyst including a titanium compound, a germanium compound, an antimony compound, an aluminum compound, a tin compound, or a mixture thereof may be used in the polycondensation reaction. The polyester resin may include 1 to 100 ppm of the polycondensation catalyst, in terms of the central metal atom content, based on the total amount of the resin.

As the titanium compound, tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetyl acetonate titanate, ethyl acetoacetate titanate, isostearoyl titanate, titanium dioxide, a titanium dioxide/silicon dioxide copolymer, or a titanium dioxide/zirconium dioxide copolymer may be exemplified.

As the germanium compound, germanium dioxide ($GeO_2$), germanium tetrachloride ($GeCl_4$), germanium ethylene glycoxide, germanium acetate, a copolymer thereof, or a mixture thereof may be exemplified. Germanium dioxide is preferably used. Crystalline or amorphous germanium dioxide may be used. Glycol soluble germanium dioxide may also be used.

According to a further embodiment of the invention, a method for preparing the polyester resin may include: esterifying diol components including 5 to 60 mole % of isosorbide, 10 to 80 mole % of a cyclohexanedimethanol, and the balance of other diol compounds, with dicarboxylic acid components including terephthalic acid in the presence of an esterification reaction catalyst including a zinc compound; adding a phosphorus-based stabilizer to the esterification reaction mixture at the time when the degree of esterification reaches at least 80%; and subjecting the esterification reaction product to polycondensation.

According to the method for preparing the polyester resin, a catalyst including a zinc compound is used for an esterification reaction, a phosphorus-based stabilizer is added to the reaction solution at the end of the esterification reaction, for example, at the time when the degree of esterification reaches at least 80%, and the resulting esterification reaction product is subjected to polycondensation. The polyester resin thus prepared exhibits excellent physical properties, such as high resistance to heat, chemicals, and impact, and has excellent appearance properties, high transparency, and superior molding characteristics.

Particularly, the polyester resin provided by the preparation method may have a lower melt viscosity upon extrusion molding than previously known polyester resins due to its molecular structural features, along with high heat resistance. This can enhance relatively high processability and moldability of the polyester resin.

Specifically, the polyester resin provided by the preparation method may have an intrinsic viscosity of 0.5 to 1.0 dl/g.

The melt viscosity of the polyester resin measured at a temperature of 280° C. and a shear rate of 300 rad/s may be at least 50% lower than that measured at a temperature of 280°

C. and a shear rate of 1 rad/s. That is, the melt viscosity of the polyester upon hot extrusion molding may be lowered to a level sufficient for molding.

The polyester may have a melt viscosity of 480 Pa·s to 600 Pa·s at a temperature of 280° C. and a shear rate of 1 rad/s, and a melt viscosity of 200 Pa·s to 280 Pa·s at a temperature of 280° C. and a shear rate of 300 rad/s.

As described above, the polyester resin provided by the preparation method has low melt viscosity characteristics upon hot extrusion molding but has a melt viscosity above a predetermined level, for example, 500 Pa·s to 600 Pa·s, when no shear force is applied thereto before or after extrusion, i.e., at a shear rate of 0 rad/s.

The melt viscosity characteristics of the polyester resin can allow a final molded article after extrusion molding to have a more uniform thickness and improved dimensional stability, and facilitate the application of the polyester resin to the manufacture of a large-volume or large-area molded article.

The use of the zinc-based catalyst and the addition of the phosphorus-based stabilizer at a predetermined time point enable completion of the esterification reaction with high efficiency in a relatively short time, specifically in 400 minutes, preferably 200 to 330 minutes, and more preferably 230 to 310 minutes. The shortened esterification reaction time shortens the contact time at a high temperature, contributing to an improvement in the color of the polyester resin. The shortened reaction time is also advantageous in terms of energy consumption reduction.

In the method for preparing the polyester resin, the amount of the diol components or dicarboxylic acid components remaining unreacted without participating in the esterification reaction may be less than 20%. This high reaction efficiency appears to be because the zinc-based catalyst is used and the phosphorus-based stabilizer is added at a predetermined time point. Thus, in the method for preparing the polyester resin, since most of the diol components or the dicarboxylic acid components as raw materials participate in the reaction, the amount of the materials remaining unreacted is relatively small. The polyester resin thus synthesized has excellent physical properties described above and can be easily applied to commercial products.

Details of the dicarboxylic acid components including terephthalic acid, cyclohexanedimethanol, isosorbide, and other diol compounds are the same as those described above.

In the esterification reaction, oligomers may be formed by the reaction of the dicarboxylic acid components with the diol components. In the method for preparing the polyester resin, the use of the zinc-based catalyst and the addition of the phosphorus-based stabilizer at a predetermined time point enable the formation of oligomers whose physical properties and molecular weight are optimized, with high efficiency.

The esterification reaction between the dicarboxylic acid components and the diol components may be carried out at a pressure of 0 to 10.0 kg/cm² and a temperature of 150 to 300° C. The esterification reaction conditions may be appropriately varied depending on specific characteristics of the final polyester, the molar ratio between the dicarboxylic acid components and glycol, or processing conditions. Specific exemplary conditions for the esterification reaction include a pressure of 0 to 5.0 kg/cm², preferably 0.1 to 3.0 kg/cm², and a temperature of 200 to 270° C., preferably 240 to 260° C.

The esterification reaction may be carried out in a batch or continuous manner. The raw materials may be separately added, but the addition of a slurry of the diol components and the dicarboxylic acid components is preferred. The slurry may be prepared by dissolving the diol components including isosorbide in the form of a solid at room temperature in water or ethylene glycol, and mixing the solution with the dicarboxylic acid components including terephthalic acid. Alternatively, the slurry may be prepared by melting isosorbide at 60° C. or higher, and mixing the molten isosorbide with the dicarboxylic acid components including terephthalic acid and the other diol components. Water may be further added to the slurry of the dicarboxylic acid components and the copolymerized diol components of isosorbide, ethylene glycol, and the others. The water addition assists in enhancing the flowability of the slurry.

The molar ratio between the dicarboxylic acid components and the diol components participating in the esterification reaction may be from 1:1.05 to 1:3.0. If the amount of the diol components is less than the lower limit (i.e. 1:1.05), the dicarboxylic acid components may remain unreacted after polymerization, causing poor transparency of the resin. Meanwhile, if the amount of the diol components exceeds the upper limit (i.e. 1:3.0), the polymerization rate may be lowered or the productivity of the resin may be deteriorated.

In the method for preparing the polyester resin, a phosphorus-based stabilizer may be added at the end of the first and second esterification reactions, for example, at the time when each of the degrees of esterification reaches at least 80%. The degree of esterification of at least 80% means that at least 80% of the dicarboxylic acid components are reacted. The degree of esterification can be measured by analyzing the content of the terminal carboxylic acid groups of the dicarboxylic acid components.

The phosphorus-based stabilizer may be used in an amount of 10 ppm to 300 ppm, preferably 20 ppm to 200 ppm, based on the weight of the resin. Specific examples of such phosphorus-based stabilizers are the same as those described above.

The addition of the phosphorus-based stabilizer at the time when the degree of esterification reaches at least 80% can contribute to a drastic reduction in the amount of unreacted raw materials and an improvement in the degree of polymerization of the resin. Therefore, the polyester resin may have the above characteristics such as high heat resistance, high viscosity, superior impact strength, and particular melt viscosity characteristics.

The esterification reaction may be carried out in the presence of an esterification reaction catalyst including a zinc compound. The catalyst may be used in an amount of 1 to 100 ppm, in terms of the central metal atom content, based on the amount of the polyester resin. Specific examples of such zinc-based catalysts include zinc acetate, zinc acetate dihydrate, zinc chloride, zinc sulfate, zinc sulfide, zinc carbonate, zinc citrate, and zinc gluconate. These zinc-based catalysts may be used alone or as a mixture thereof. If the content of the zinc-based catalyst is less than the lower limit, it may be difficult to markedly improve the efficiency of the esterification reaction and the amount of the reactants that do not participate in the reaction may be considerably increased. Meanwhile, if the content of the zinc-based catalyst exceeds the upper limit, the appearance properties of the polyester resin may be deteriorated.

The polycondensation reaction may include allowing the esterification reaction product of the dicarboxylic acid components and the diol components to react at a temperature of 150 to 300° C. and a reduced pressure of 600 to 0.01 mmHg for 1 to 24 hours.

The polycondensation reaction may be carried out at a temperature of 150 to 300° C., preferably 200 to 290° C., and more preferably 260 to 280° C., and a reduced pressure of 600 to 0.01 mmHg, preferably 200 to 0.05 mmHg, and more preferably 100 to 0.1 mmHg. The reduced pressure condition of the polycondensation reaction enables the removal of glycol, a by-product of the polycondensation reaction, from the system. If the polycondensation reaction is carried out outside the reduced pressure range defined above (400 to 0.01 mmHg), removal of the by-product may be insufficient.

If the polycondensation reaction is carried out at a temperature lower than 150° C., glycol, a by-product of the polycondensation reaction, cannot be effectively removed from the system, and as a result, the intrinsic viscosity of the final reaction product may be lowered, which deteriorates the physical properties of the polyester resin. Meanwhile, if the reaction is carried out at a temperature higher than 300° C., there is a high possibility that the polyester resin may be yellowed in appearance. The polycondensation reaction may be carried out for a time necessary for the intrinsic viscosity of the final reaction product to reach an appropriate level, for example, for an average retention time of 1 to 24 hours.

The method for preparing the polyester resin may further include adding a polycondensation catalyst. The polycondensation catalyst may be added to the esterification or transesterification reaction product before initiation of the polycondensation reaction. Alternatively, the polycondensation catalyst may be added to a slurry including the diol components and the dicarboxylic acid components before or during the esterification reaction.

As the polycondensation catalyst, a titanium compound, a germanium compound, an antimony compound, an aluminum compound, a tin compound, or a mixture thereof may be used. Examples of the titanium compound and the germanium compound are the same as those described above.

Advantageous Effect of the Invention

The polyester resin of the present invention exhibits excellent physical properties such as high resistance to heat, chemicals, and impact, and has excellent appearance properties, high transparency, and superior molding characteristics. The method of the present invention is suitable for preparing the polyester resin.

DETAILS FOR PRACTICING THE INVENTION

The invention will be explained in more detail with reference to the following examples. However, these examples are provided for illustrative purposes and are not intended to limit the scope of the present invention.

Examples 1-4

Preparation of Polyester Resins

The reactants and zinc acetate (an esterification reaction catalyst) in the amounts shown in Table 1 were mixed in a 7 L reactor. The mixture was subjected to esterification (ES) at a pressure of 2.0 kg/cm$^2$ and a temperature of 255° C. for the reaction time shown in Table 1.

150 ppm of triethyl phosphate as a phosphate stabilizer was added to the esterification reaction product at the time when the degree of esterification reached at least 80%.

When 80-99% of water as a by-product was discharged from the system after completion of the esterification reaction, a germanium catalyst was added in an amount of 200 ppm (in terms of the central element content) with respect to the total weight of the reactants. Thereafter, a polycondensation reaction was carried out at a pressure of 0.5 mmHg and a temperature of 275° C. The reaction was continued until the viscosity reached a desired level, affording a polyester resin.

Comparative Examples 1-5

Preparation of Polyester Resins

Polyester Resins were Prepared in the Same Manner as in Examples 1-4, except that the esterification reaction catalyst was not used and the compositions of the reactants were changed as shown in Table 2. The phosphorus-based stabilizer was not added in Comparative Examples 1, 4, and 5, and the phosphorus-based stabilizer was added to the reactants at the initial stage of the reaction in Comparative Examples 2 and 3.

The polycondensation was carried out in the same manner as in Examples 1-4.

Experimental Examples 1-4

Measurements of Physical Properties of Polyester Resins Prepared in Examples 1-4 and Comparative Examples 1-5

The physical properties of the polyester resins prepared in Examples 1-4 and Comparative Examples 1-5 were measured by the following methods. The results are shown in Tables 1 and 2.

Experimental Example 1

Measurement of Intrinsic Viscosity (IV)

Each of the polymers was dissolved in ortho-chlorophenol (OCP) at 150° C. The concentration of the polymer was adjusted to 0.12%. The measurement was done using an Ubbelohde viscometer in a thermostatic bath at 35° C.

Experimental Example 2

Measurement of Melt Viscosity (1) Each of the polyester resins prepared in Examples 1-4 and Comparative Example 1-5 was pre-heated at 280° C. for 5 min, and 5% strain was applied thereto with a 1 mm gap plate-plate type. The melt viscosity of the polyester resin was measured using a Physica rheometer (MCR301, Anton Paar) in the range of 0.01 rad/s to 500 rad/s (shear rate sweep).

(2) The melt viscosity of the polyester resin at 0 rad/s was determined from a plot of viscosity against shear rate viscosities by extrapolating the measured data back to 0 rad/s.

Experimental Example 3

Measurement of Heat Resistance (Tg)

Each of the polyester resins was annealed at 300° C. for 5 min, cooled to room temperature, and heated at a rate of 10° C./min ($2^{nd}$ scan). The glass-rubber transition temperature (Tg) of the resin was measured during the $2^{nd}$ scan.

Experimental Example 4

Measurement of Reaction Rates of Monomers

The reaction rates of the monomers used in Examples 1-4 and Comparative Examples 1-5 were determined by measuring the amounts of unreacted terminal carboxylic acid groups using a titration method. Specifically, 0.1 g of each of the samples from Examples 1-4 and Comparative Examples 1-5 was added to 10 mL of benzyl alcohol and dissolved at about 200° C. After addition of phenol red as a pH indicator, the solution was titrated with 0.1 N—NaOH to quantify the amount of the terminal —COOH groups.

The compositions of the resins of Examples 1-4 and Comparative Examples 1-5, and the experimental results, are shown in Tables 1 and 2.

TABLE 1

Compositions of the resins of Examples 1-4 and results of Experimental Examples 1-4

| Components | | Example 1 | Example 2 | Example 3 | Example 4 |
|---|---|---|---|---|---|
| Diacid components | TPA (wt %) | 100 | 100 | 100 | 100 |
| | AA (wt %) | — | — | — | — |
| | CHDA (wt %) | — | — | — | — |
| Diol components | ISB (wt %) | 7 | 23 | 30 | 60 |
| | CHDM (wt %) | 30 | 20 | 61 | 35 |
| | EG (wt %) | 63 | 57 | 9 | 5 |
| | BPA-EO (wt %) | 0 | 0 | 0 | 0 |
| ES reaction catalyst | Zn (ppm) | 20 | 15 | 30 | 50 |
| Time for stabilizer addition | Initial stage/ end of ES | End | End | End | End |
| Experimental results | Reaction rate of monomers (%) | 82 | 91 | 91 | 87 |
| | ES reaction time (min) | 264 | 259 | 310 | 280 |
| | IV (dl/g) | 0.8 | 0.6 | 0.66 | 0.53 |
| | Heat resistance (Tg) | 88 | 90 | 106 | 121 |
| | Melt viscosity (Pa * s) 0 rad/s | 511 | 521 | 533 | 545 |
| | Melt viscosity (Pa * s) 1 rad/s | 501 | 513 | 525 | 531 |
| | Melt viscosity (Pa * s) 300 rad/s | 238 | 236 | 250 | 234 |

As can be seen from the results in Table 1, at least 80% of the reactant raw materials (monomers) used for the preparation of the polyester resins in Examples 1-4 participated in the reactions. The completion of the reactions within 259-310 min was confirmed.

Even when considerably increased amounts of isosorbide with relatively low reactivity were used in Examples 1-4, high heat resistance and relatively high intrinsic viscosities of the polyester resins could be ensured. For example, high intrinsic viscosities of 0.53 dl/g could be ensured even when the content of isosorbide in the diol components was 60 wt %.

Furthermore, it was found that the melt viscosities of the polyesters of Examples 1-4 at a temperature of 280° C. and a shear rate of 300 rad/s were at least 50% lower than those measured at a temperature of 280° C. and a shear rate of 1 rad/s. That is, it was confirmed that the melt viscosities of the polyesters of Examples 1-4 upon hot extrusion molding could be lowered to a level sufficient for molding.

The polyester resins of Examples 1-4 were confirmed to have melt viscosities of 511-545 Pa·s when no shear force was applied thereto before or after extrusion, i.e., at a shear rate of 0 rad/s. That is, the melt viscosity characteristics of the polyester resins of Examples 1-4 can allow final molded articles after extrusion molding to have more uniform thicknesses and improved dimensional stability, and facilitate the application of the polyester resins to the manufacture of large-volume or large-area molded articles.

TABLE 2

Compositions of the resins of Comparative Examples 1-5 and results of Experimental Examples 1-4

| Components | | Comparative Example 1 | Comparative Example 2 | Comparative Example 3 | Comparative Example 4 | Comparative Example 5 |
|---|---|---|---|---|---|---|
| Diacid components | TPA (wt %) | 100 | 100 | 100 | 100 | 100 |
| | AA (wt %) | — | — | — | — | — |
| | CHDA (wt %) | — | — | — | — | — |
| Diol components | ISB (wt %) | 3 | 35 | 70 | — | — |
| | CHDM (wt %) | — | — | — | 30 | 50 |
| | EG (wt %) | 97 | 65 | 30 | 70 | 50 |
| | BPA-EO (wt %) | 0 | 0 | 0 | 0 | 0 |
| ES reaction catalyst | Zn (ppm) | 0 | 0 | 0 | 0 | 0 |
| Time for stabilizer addition | Initial stage/end of ES | — | Initial stage | Initial stage | — | — |
| Experimental results | Reaction rate of monomers (%) | 88 | 92 | 68 | 95 | 76 |
| | ES reaction time (min) | 266 | 384 | 420 | 275 | 264 |
| | IV (dl/g) | 0.72 | 0.44 | 0.34 | 0.75 | 0.72 |
| | Heat resistance (Tg) | 80° C. | 129° C. | 118° C. | 75° C. | 80° C. |
| | Melt viscosity (Pa · s) 0 rad/s | 478 | 495 | 511 | 485 | 468 |
| | Melt viscosity (Pa · s) 1 rad/s | 466 | 481 | 499 | 475 | 460 |
| | Melt viscosity (Pa · s) 300 rad/s | 301 | 324 | 328 | 332 | 315 |

As can be seen from the results in Table 2, when considerably increased amounts of isosorbide with low reactivity were used in Comparative Examples 1-5, the intrinsic viscosities of the polyester resins were greatly reduced. Specifically, it was confirmed that when isosorbide of the diol components was used in amounts of 35 wt % and 70 wt % in Comparative Examples 2-3, respectively, the intrinsic viscosities of the polyesters were reduced to less than 0.45 dl/g.

Further, when the phosphorus-based stabilizer was added at the initial stage of the reactions in Comparative Examples 2-3, the effect of reducing the reaction times was negligible and the reaction rates of the monomers were not significantly increased despite the increased reaction times.

The melt viscosities of the polyesters of Comparative Examples 1-5 at a temperature of 280° C. and a shear rate of 300 rad/s were not significantly lowered compared to those measured at a temperature of 280° C. and a shear rate of 1 rad/s. That is, the polyesters of Comparative Examples 1-4 have low moldability or poor melt viscosity characteristics upon hot extrusion molding compared to the polyesters of Example 1-5.

Further, the polyester resin of Comparative Example 3, which was prepared using 70 wt % of isosorbide in the diol components, was found to have a melt viscosity of 511 Pa·s when no shear force was applied thereto before or after extrusion, i.e., at a shear rate of 0 rad/s. The other polyester resins were found to have melt viscosities lower than 500 Pa·s. That is, the use of the polyester resins of Comparative Examples 1-5 may cause final molded articles to have relatively non-uniform thicknesses or poor dimensional stability, thus being unsuitable for the application to the manufacture of large-volume or large-area molded articles.

What is claimed is:

1. A polyester resin comprising:
    moieties of dicarboxylic acid components comprising terephthalic acid; and
    moieties of diol components comprising 5 to 60 mole % of isosorbide, 10 to 80 mole % of a cyclohexanedimethanol, and the balance of other diol compounds,
    wherein the polyester resin has an intrinsic viscosity of 0.5 to 1.0 dl/g,
    the polyester resin contains 1 ppm to 100 ppm of a zinc-based catalyst, in terms of the central metal atom content, based on the total amount of the resin, and 10 ppm to 300 ppm of a phosphorus-based stabilizer, and
    the melt viscosity of the polyester resin measured at a temperature of 280° C. and at a shear rate of 300 rad/s is at least 50% lower than that measured at a temperature of 280° C. and a shear rate of 1 rad/s.

2. The polyester resin according to claim 1,
    wherein the polyester resin has a melt viscosity of 480 Pa·s to 600 Pa·s at a temperature of 280° C. and a shear rate of 1 rad/s.

3. The polyester resin according to claim 1,
    wherein the polyester resin has a melt viscosity of 500 Pa·s to 600 Pa·s at a temperature of 280° C. and a shear rate of 0 rad/s.

4. The polyester resin according to claim 1,
    wherein the polyester resin has a melt viscosity of 200 Pa·s to 280 Pa·s at a temperature of 280° C. and a shear rate of 300 rad/s.

5. The polyester resin according to claim 1,
    wherein the other diol compounds comprise at least one compound selected from the group consisting of aliphatic diol compounds and aromatic diol compounds.

6. The polyester resin according to claim 1,
    wherein the phosphorus-based stabilizer comprises at least one compound selected from the group consisting of phosphoric acid, trimethyl phosphate, triethyl phosphate, triphenyl phosphate, and triethyl phosphonoacetate.

7. The polyester resin according to claim 1,
    wherein the zinc-based catalyst comprises at least one compound selected from the group consisting of zinc acetate, zinc acetate dihydrate, zinc chloride, zinc sulfate, zinc sulfide, zinc carbonate, zinc citrate, and zinc gluconate.

8. The polyester resin according to claim 1,
    further comprising 1 to 100 ppm of at least one polycondensation reaction catalyst selected from the group consisting of titanium compounds, germanium compounds, antimony compounds, aluminum compounds, and tin compounds, based on the total amount of the resin.

9. A method for preparing the polyester resin according to claim 1, the method comprising:
    esterifying diol components comprising 5 to 60 mole % of isosorbide, 10 to 80 mole % of a cyclohexanedimethanol, and the balance of other diol compounds, with dicarboxylic acid components comprising terephthalic acid in the presence of an esterification reaction catalyst comprising a zinc compound;
    adding a phosphorus-based stabilizer to the esterification reaction mixture at the time when the degree of esterification reaches at least 80%; and
    subjecting the esterification reaction product to polycondensation,
    wherein the amount of the diol components or dicarboxylic acid components remaining unreacted without participating in the esterification reaction is less than 20%.

10. The method according to claim 9,
    wherein the polyester resin has an intrinsic viscosity of 0.5 to 1.0 dl/g, and
    the melt viscosity of the polyester resin measured at a temperature of 280° C. and at a shear rate of 300 rad/s is at least 50% lower than that measured at a temperature of 280° C. and a shear rate of 1 rad/s.

11. The method according to claim 9,
    wherein the polyester resin has a melt viscosity of 500 Pa·s to 600 Pa·s at a temperature of 280° C. and a shear rate of 0 rad/s.

12. The method according to claim 9,
    wherein the phosphorus-based stabilizer is used in an amount of 10 ppm to 300 ppm, based on the weight of the resin.

13. The method according to claim 9,
    wherein the molar ratio between the dicarboxylic acid components and the diol components in the esterification reaction is from 1:1.05 to 1:3.0.

14. The method according to claim 9,
    wherein the esterification reaction is carried out at a pressure of 0 to 10.0 kg/cm2 and a temperature of 150 to 300° C.

15. The method according to claim 9,
    wherein the esterification reaction is carried out for 200 to 330 minutes.

16. The method according to claim 9,
    wherein the polycondensation reaction is carried out at a temperature of 150 to 300° C. and a reduced pressure of 600 to 0.01 mmHg for 1 to 24 hours.

17. The method according to claim 9,
further comprising adding at least one catalyst compound selected from the group consisting of titanium compounds, germanium compounds, antimony compounds, aluminum compounds, and tin compounds.

\* \* \* \* \*